(12) United States Patent
Puttichaem et al.

(10) Patent No.: US 9,171,562 B1
(45) Date of Patent: Oct. 27, 2015

(54) PATTERNED METAL LAYER TO CONTROL SOLDER CONNECTION BETWEEN LASER AND SUBMOUNT IN A MAGNETIC HEAD

(71) Applicant: Western Digital (Fremont), LLC, Fremont, CA (US)

(72) Inventors: Wachira Puttichaem, Muang (TH); Bin Ouyang, Klong Luang (TH)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/663,031

(22) Filed: Mar. 19, 2015

(51) Int. Cl.
| | |
|---|---|
| *G11B 11/00* | (2006.01) |
| *G11B 13/08* | (2006.01) |
| *G11B 5/48* | (2006.01) |
| *G11B 5/60* | (2006.01) |
| *G11B 7/12* | (2012.01) |
| *G11B 5/00* | (2006.01) |

(52) U.S. Cl.
CPC ............ *G11B 5/4866* (2013.01); *G11B 5/4813* (2013.01); *G11B 5/6082* (2013.01); *G11B 5/6088* (2013.01); *G11B 7/1205* (2013.01); *G11B 7/1206* (2013.01); *G11B 2005/0021* (2013.01)

(58) Field of Classification Search
CPC ...................... G11B 5/6088; G11B 2005/0005; G11B 5/4826; G11B 5/105; G11B 5/4866; G11B 5/6082; G11B 7/12; G11B 7/1206; G11B 7/127; G11B 7/1205; G11B 7/22; G11B 2924/00; G11B 23/49811; H01S 5/02272; H01S 5/0216; H01S 5/02236; H01S 5/02252; Y10T 29/49032
See application file for complete search history.

(56) References Cited

U.S. PATENT DOCUMENTS

| | | |
|---|---|---|
| 5,311,405 A | 5/1994 | Tribbey et al. |
| 6,075,673 A | 6/2000 | Wilde et al. |
| 6,097,575 A | 8/2000 | Trang et al. |
| 6,125,014 A | 9/2000 | Riedlin, Jr. |
| 6,125,015 A | 9/2000 | Carlson et al. |
| 6,130,863 A | 10/2000 | Wang et al. |
| 6,137,656 A | 10/2000 | Levi et al. |
| 6,144,528 A | 11/2000 | Anaya-Dufresne et al. |
| 6,147,838 A | 11/2000 | Chang et al. |
| 6,151,196 A | 11/2000 | Carlson et al. |
| 6,178,064 B1 | 1/2001 | Chang et al. |
| 6,181,522 B1 | 1/2001 | Carlson |
| 6,181,673 B1 | 1/2001 | Wilde et al. |
| 6,229,672 B1 | 5/2001 | Lee et al. |
| 6,236,543 B1 | 5/2001 | Han et al. |
| 6,246,547 B1 | 6/2001 | Bozorgi et al. |
| 6,249,404 B1 | 6/2001 | Doundakov et al. |
| 6,330,131 B1 | 12/2001 | Nepela et al. |
| 6,339,518 B1 | 1/2002 | Chang et al. |

(Continued)

*Primary Examiner* — Dionne Pendleton

(57) ABSTRACT

A laser diode device is affixed to a mounting face of a slider, opposite the air bearing surface. The laser includes a submount having an electrically conductive surface layer that is normal to the mounting face. The electrically conductive surface layer is a patterned metal layer that includes a lateral probing region and a laser mounting region to which a laser is soldered. The laser mounting region is connected to the lateral probing region by a bridge portion of the patterned metal layer. The laser mounting region is otherwise separated from the lateral probing region by a solder blocking gap in which the submount lacks the patterned metal layer, and which is adjacent to the laser. The solder blocking gap defines a solder blocking gap height normal to the mounting face that is in the range of ⅔rds to ⅝ths of a total height of the laser mounting region.

20 Claims, 7 Drawing Sheets

(56) References Cited

U.S. PATENT DOCUMENTS

| | | |
|---|---|---|
| 6,349,017 B1 | 2/2002 | Schott |
| 6,373,660 B1 | 4/2002 | Lam et al. |
| 6,378,195 B1 | 4/2002 | Carlson |
| 6,522,504 B1 | 2/2003 | Casey |
| 6,538,850 B1 | 3/2003 | Hadian et al. |
| 6,583,953 B1 | 6/2003 | Han et al. |
| 6,627,096 B2 | 9/2003 | Sherrer et al. |
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,502,397 B2 | 3/2009 | Naganuma |
| 7,522,649 B2 | 4/2009 | Ha et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,729,089 B1 | 6/2010 | Hogan |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,247,833 B2 | 8/2012 | Shen et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,456,961 B1 | 6/2013 | Wang et al. |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 2002/0089913 A1 | 7/2002 | Moriyama et al. |
| 2008/0056073 A1* | 3/2008 | Shimizu ............... 369/13.02 |
| 2008/0316872 A1* | 12/2008 | Shimizu et al. ...... 369/13.24 |
| 2011/0216635 A1* | 9/2011 | Matsumoto ........... 369/13.33 |
| 2013/0244541 A1 | 9/2013 | Yaemglin et al. |
| 2013/0293982 A1 | 11/2013 | Huber |

\* cited by examiner

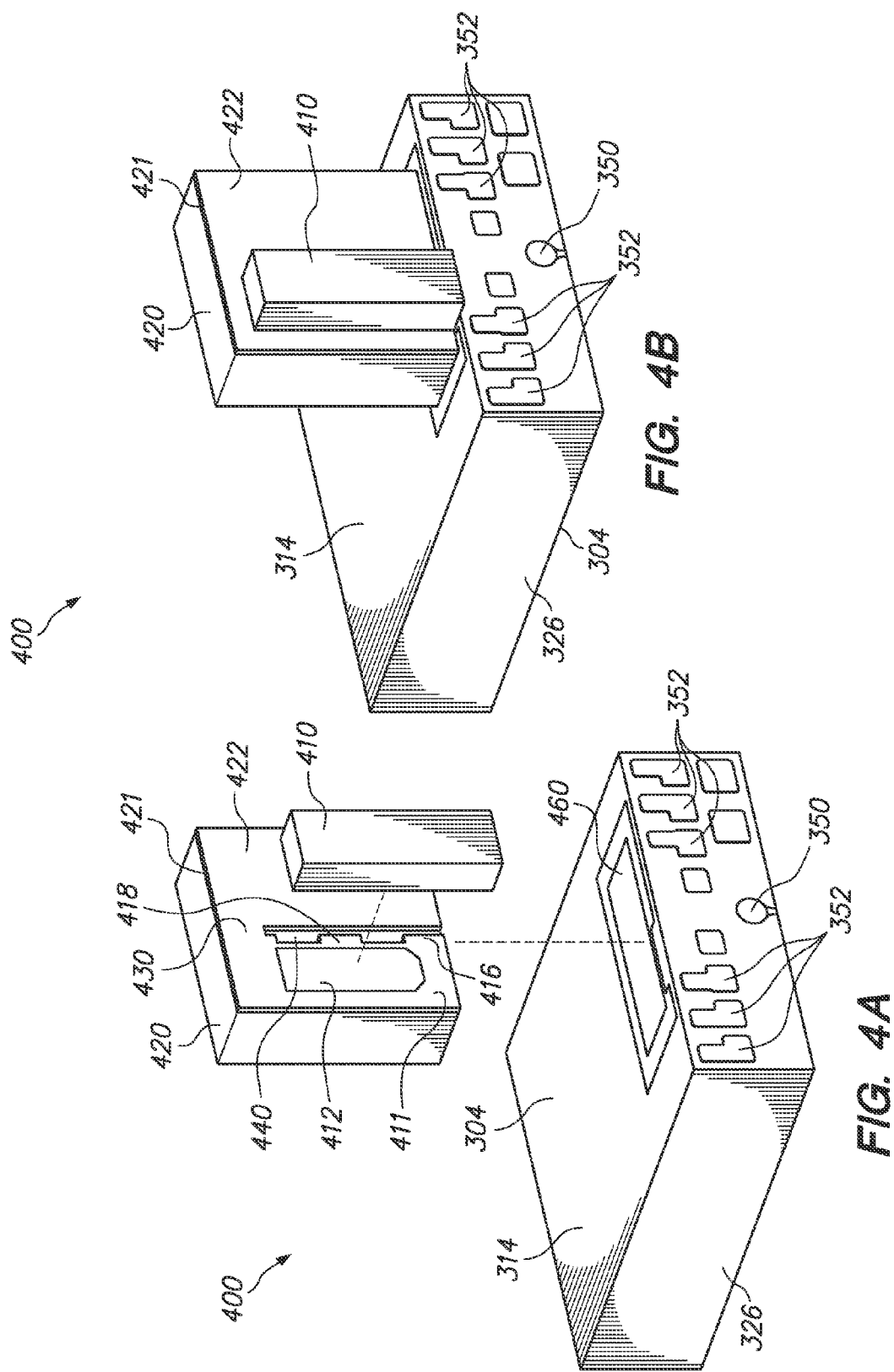

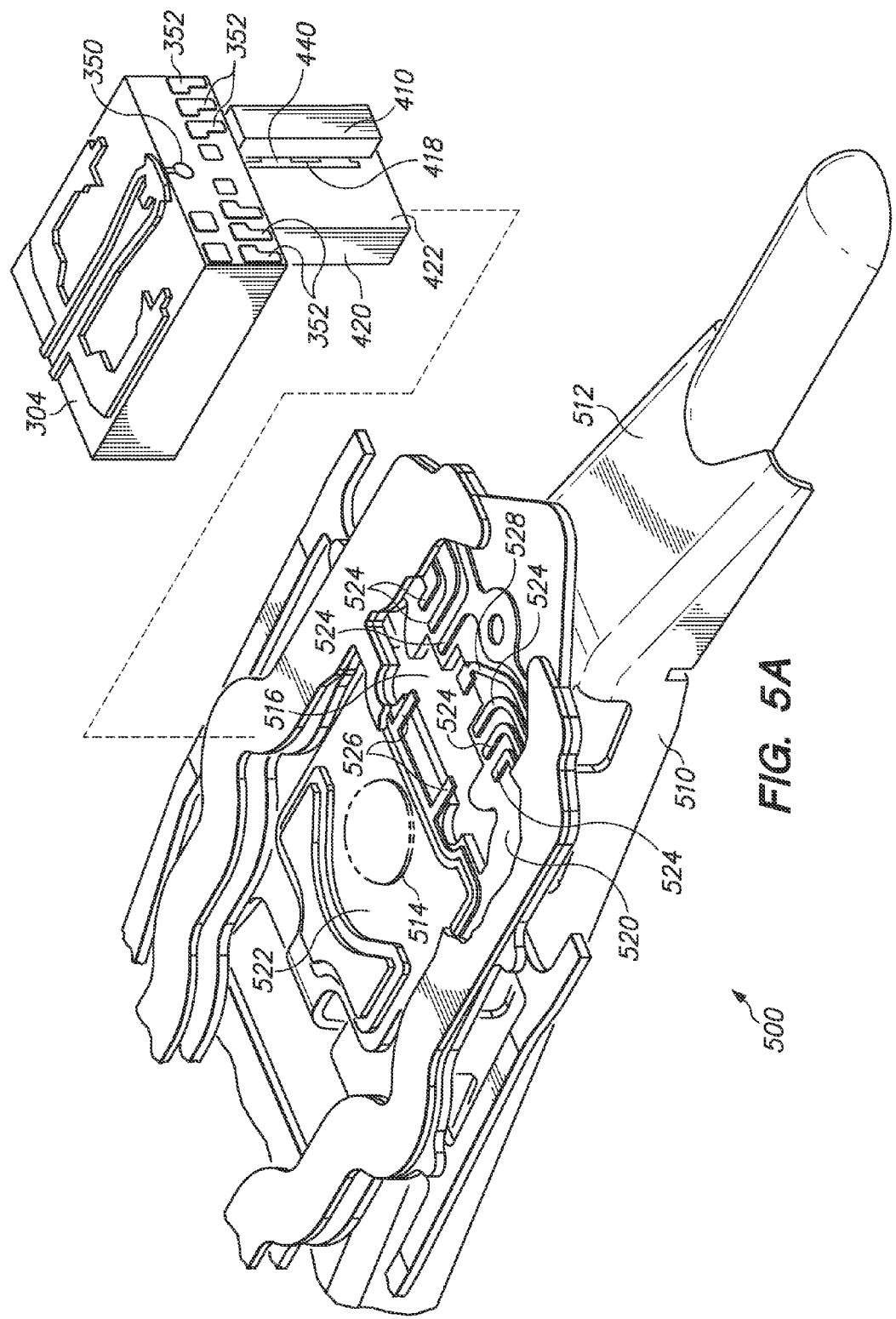

PATTERNED METAL LAYER TO CONTROL SOLDER CONNECTION BETWEEN LASER AND SUBMOUNT IN A MAGNETIC HEAD

BACKGROUND

Magnetic hard disk drives retrieve and/or store data in computers and other consumer electronics devices. A magnetic hard disk drive includes one or more heads that can read and write information on a corresponding magnetic surface of a spinning disk. For convenience, all heads that can read are referred to as "read heads" or "heads" herein, regardless of other devices and functions the read head may also perform (e.g. writing, micro-actuation, flying height control, touch down detection, lapping control, localized disk media heating, etc). Each read head is a sub-component of a head gimbal assembly (HGA). The HGA also includes a suspension assembly for holding the head and providing a plurality of electrical connections thereto. The suspension assembly typically includes a fragile laminated flexure to carry the electrical signals to and from the head.

The head typically comprises a slider that includes an air bearing surface (ABS) that faces the magnetic disk surface, a trailing face, and a mounting face that is opposite the ABS and that faces away from the ABS. A magnetic sensor and a plurality of head bond pads are typically disposed on the trailing face of the slider. The mounting face of the slider is typically permanently bonded to a tongue portion of the fragile laminated flexure by an adhesive, in a position such that the plurality of head bond pads are aligned with corresponding bond pads on the laminated flexure.

Conventionally, the head writes tiny magnetic transitions on the magnetic disk surface by applying sufficient magnetic field to the desired microscopic disk surface location to overcome the coercivity of the disk surface material there, and thereby changes the remnant field there. However, market demand for disk drives having ever higher data storage capacity has motivated investigation into the possible use of "energy assisted" magnetic recording (EAMR), in which writing is accomplished not only by local application of a magnetic field, but also by local application of laser light for localized heating of the disk surface. EAMR may enable the writing of smaller transitions, and thereby increase the areal density of data stored on the disk surface.

Most proposed EAMR technologies require the addition of a laser light source on the read head. For example, a laser diode may be attached to a laser submount, and the laser submount attached to the mounting face of the slider, for example by soldering with a gold-tin solder alloy. During the assembly process, one or more electrically conductive probing pins may temporarily be brought into contact with an electrically conductive probing region of the laser submount, to energize the laser diode so that emitted laser light may be used for the alignment of parts. However, in a high volume manufacturing environment, it may difficult to control the amount and location of the solder that affixes the laser diode to the laser submount. Consequently, solder may undesirably migrate to the probing region of the laser submount during assembly, which may interfere with the alignment of parts.

Accordingly, there is a need in the art for an improved laser submount design that can better facilitate reliable and practical assembly with a laser light source for EAMR heads, in a high volume manufacturing environment.

BRIEF DESCRIPTION OF THE DRAWINGS

FIG. 4A is a perspective view of a head-laser submount assembly (HLSA) capable of including an embodiment of the present invention, having a laser device exploded away from the mounting surface of the head.

FIG. 4B is a perspective view of the HLSA of FIG. 4A, except with the laser device attached to the mounting surface of the head.

FIG. 5A is a perspective view of the distal portion of a head gimbal assembly (HGA) capable of including an embodiment of the present invention, with a head (with mounted laser device) being exploded away from the suspension assembly.

DESCRIPTION OF EXAMPLE EMBODIMENTS

Figure 1:
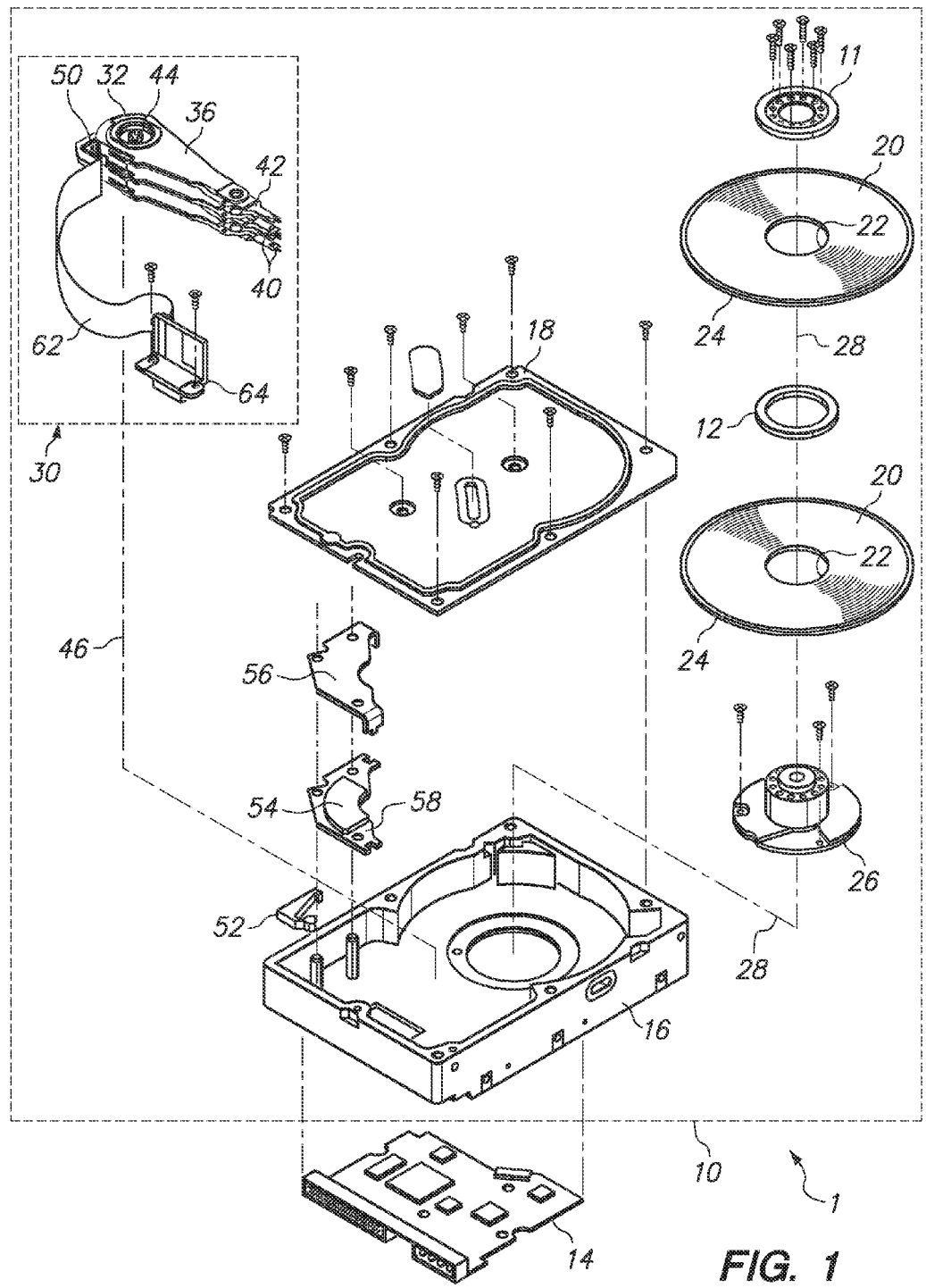
FIG. 1 is an exploded perspective view of a disk drive capable of including an embodiment of the present invention.

FIG. 1 is a perspective view of a disk drive 1 capable of including an embodiment of the present invention. The disk drive 1 includes a head disk assembly (HDA) 10 and a printed circuit board (PCB) 14. The HDA 10 includes a disk drive base 16 and a disk drive cover 18, that together enclose other components of the HDA 10. At least one disk 20 is rotatably mounted to the disk drive base 16 by a spindle motor 26. The HDA 10 optionally includes one or more additional disks 20, also rotatably mounted to the disk drive base 16 by spindle motor 26, with the disks 20 then separated by one or more spacer rings 12.

The disks 20 may comprise an aluminum, glass, or ceramic substrate, with the substrate optionally being coated with a NiP under-layer, at least one thin-film magnetic layer, a diamond-like amorphous carbon protective layer, and a very thin lubricant layer, for example. The disks 20 are annular in shape, having an outer periphery 24 and an inner periphery 22, and may be clamped to a rotating hub of the spindle motor 26, by a clamp 11. The rotating hub of the spindle motor 26 rotates the disks 20 about a disk axis of rotation 28.

The HDA 10 also includes a head stack assembly (HSA) 30 that includes an actuator 32 that is pivotably mounted to the disk drive base 16 by a pivot bearing 44 that is inserted as a cartridge into a bore in the actuator 32. The pivot bearing 44 allows the actuator 32 to pivot about an actuator pivot axis 46. The actuator 32 may be fabricated from any suitable material having sufficient stiffness to weight, for example aluminum, magnesium, beryllium, or stainless steel. The pivot bearing 44 may be retained in the bore by a tolerance ring or may be otherwise retained (e.g. by an adhesive). The angular range of motion of the actuator 32 may be limited by a latch and crash stop mechanism 52. The actuator 32 includes at least one actuator arm 36 that extends away from the pivot bearing 44, and an actuator coil 50 that extends away from the pivot bearing 44 in a direction generally opposite the actuator arm 36.

The actuator coil 50 may fit in a yoke structure that optionally comprises a top plate 56 and a bottom plate 58, to form a voice coil motor (VCM). One or both of the top plate 56 and the bottom plate 58 may support a permanent magnet(s) of the VCM (e.g. permanent magnet 54). The top plate 56 and/or the bottom plate 58 preferably comprise a ferromagnetic metal so as to provide a return path for magnetic flux from the permanent magnet(s) through the yoke structure. The ferromagnetic metal yoke structure including the top plate 56 and the bottom plate 58 is preferably affixed to the disk drive base 16, for example by an adhesive, one or more fasteners, and/or magnetic attraction.

A plurality of head gimbal assemblies 42 may be attached to arms 36 of the actuator 32, for example by swaging. A flexible printed circuit (FPC) 62 (also known as a "flex cable") may also be attached to the actuator 32. Each of the head gimbal assemblies 42 may include a read head 40 that is bonded to a laminated flexure having a flexure tail that is electrically connected to the FPC 62. The FPC 62 can communicate electrical signals, via these electrical connections and via a flex bracket 64, between the head gimbal assemblies 42 and an external electronic system that is disposed on the PCB 14.

The actuator 32, head gimbal assemblies 42, and FPC 62 all may be considered as components of the HSA 30. The HDA 10 may have additional components that are not shown in FIG. 1. For example, the HDA 10 may also include a conventional head loading ramp (not shown), that may be positioned adjacent the disks 20 to facilitate merging of the head gimbal assemblies 42 onto surfaces of the disks 20.

Figure 2:
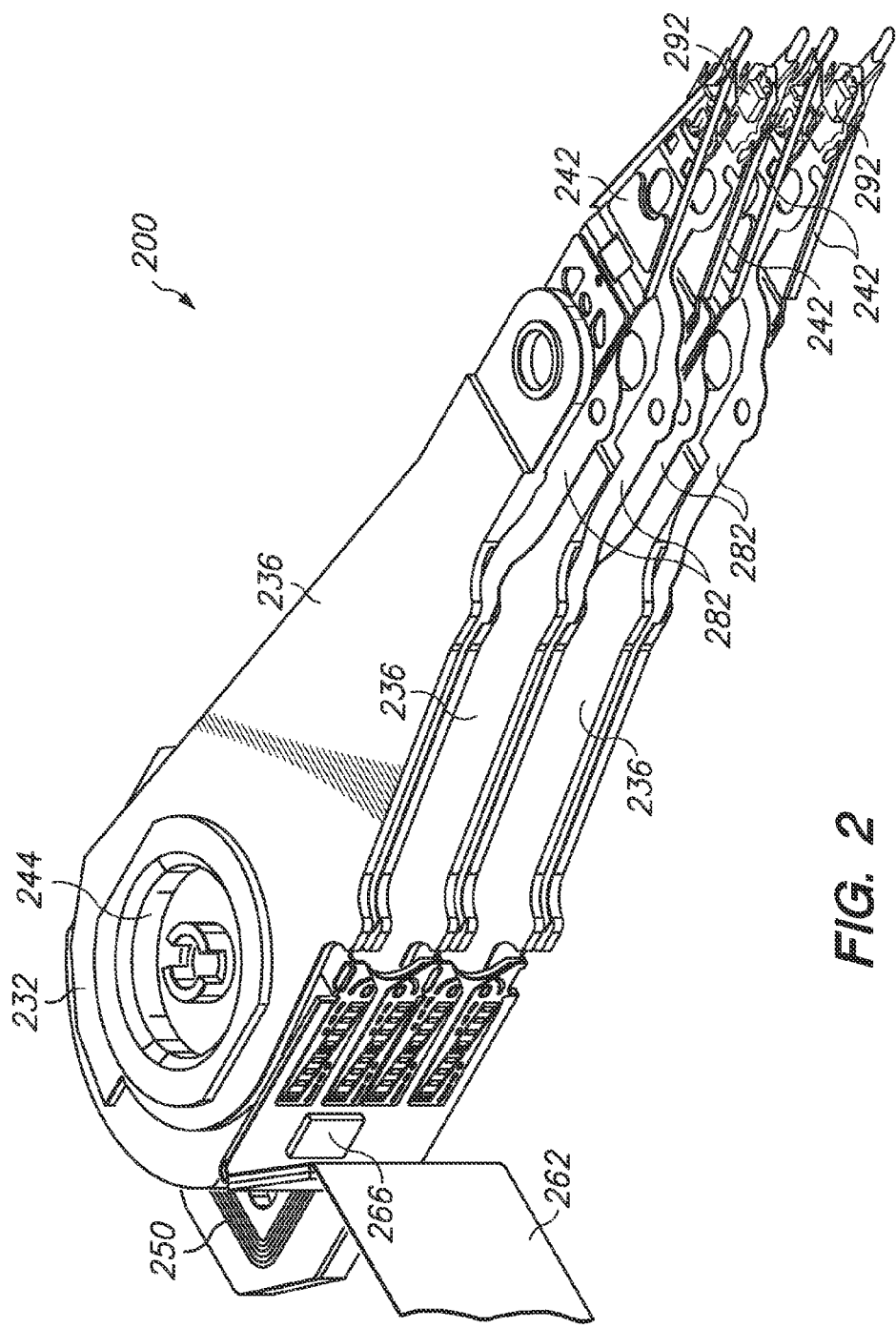
FIG. 2 is a top perspective view of a head stack assembly (HSA), capable of including an embodiment of the present invention.

FIG. 2 is a top perspective view of a head stack assembly (HSA) 200, capable of including an embodiment of the present invention. The HSA 200 includes an actuator 232 pivotably attachable to a disk drive base by a pivot bearing 244 that is inserted as a cartridge into a bore in the actuator 232. The actuator 232 may be fabricated from a suitable metal such as aluminum, magnesium, beryllium, or stainless steel, or a relatively low mass density non-metallic or composite material having sufficient stiffness. The pivot bearing 244 may be retained in the bore by a tolerance ring or may be otherwise retained (e.g. by an adhesive). The actuator 232 includes a plurality of actuator arms 236 that extends away from the pivot bearing 244, and an actuator coil 250 that extends away from the pivot bearing 244 in a direction generally opposite the actuator arms 236.

In the embodiment of FIG. 2, a plurality of head gimbal assemblies (HGAs) 242 are shown to be attached to arms 236 of the actuator 232. Each HGA includes a read head 292 and a suspension assembly to which the read head 292 is attached. Specifically, each read head 292 is attached and electrically connected to a laminated flexure 282 of the suspension assembly of the HGA 242. The suspension assembly of each HGA 242 is shown to be attached to one of the actuator arms 236, for example by swaging. A flexible printed circuit (FPC) 262 is also shown to be attached to the actuator 232. Each laminated flexure 282 includes a plurality of conductive traces, and each laminated flexure 282 has a flexure tail that extends to the FPC 262, where the plurality of conductive traces is connected to the FPC 262 near a pre-amplifier chip 266.

Figure 3:
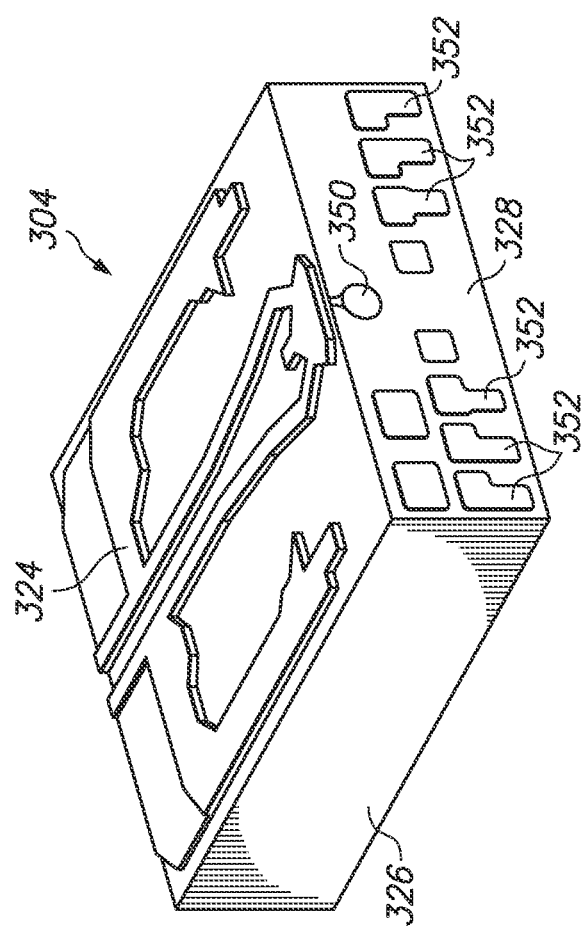
FIG. 3 depicts a head capable of use with an embodiment of the present invention, as viewed from a perspective angle towards the air bearing surface of the head.

FIG. 3 depicts a read head 304, as viewed from a perspective angle towards its air bearing surface 324. The read head 304 comprises a slider 326 which includes the air bearing surface 324, a trailing face 328 that is normal to the air bearing surface 324, and a mounting face (not visible from the view angle of FIG. 3, but which is opposite and substantially parallel to the air bearing surface 324). The air bearing surface 324 may be of any conventional design, and is not restricted to the design shown in FIG. 3. The head 304 also comprises a plurality of head bond pads 352 that are disposed on the trailing face 328 and that are electrically conductive. The head bond pads 352 may comprise gold and/or copper, for example.

In the embodiment of FIG. 3, a magnetic transducer 350 is disposed on the trailing face of the slider 326. The magnetic transducer 350 may include a magneto-resistive read sensor (e.g. a tunneling magneto-resistive read sensor) and a magneto-inductive write transducer, for example. The slider 326 may comprise a ceramic material such as AlTiC, for example.

FIG. 4A is a perspective view of a head-laser submount assembly (HLSA) 400 according to an embodiment of the present invention, having a laser device (e.g. a laser diode 410 with submount 420) exploded away from the mounting face 314 of the slider 326 of the head 304. As shown in FIG. 4A, a portion of the mounting face 314 of the slider 326 may include a deposited laminated metalization 460 to help create a reliable solder bond between the laser submount 420 and the mounting face 314 of the slider 326.

FIG. 4B is a perspective view of the HLSA 400 of FIG. 4A, except with the submount 420 soldered to the mounting face 314 of the slider 326. Numerical labels in FIGS. 4A and 4B that are the same as those described previously with reference to FIG. 3, have the same meaning but to preserve conciseness may not be described again with reference to FIGS. 4A and 4B.

In the embodiment of FIGS. 4A and 4B, the laser submount 420 includes an electrically conductive surface layer 421 that is normal to the mounting face 314 of the slider 326. The electrically conductive surface layer 421 of the laser submount 420 may be a patterned metal layer (e.g. having a thickness optionally in the range 100 nm to 600 nm) that includes a laser diode mounting region 411 and a lateral probing region 422. The laser diode mounting region 411 is not necessarily central to the laser submount 420, but it is often but not necessarily central to the attached laser diode 410. The laser diode 410 may be soldered to the laser diode mounting region 411 by a deposited solder material 412 that preferably includes gold and/or tin and optionally has a solder material thickness in the range 1 micron to 3 microns.

In the embodiment of FIG. 4A, the laser diode mounting region 411 is electrically connected to the lateral probing region 422 by a bridge portion 430 of the patterned metal layer 421. However, the laser diode mounting region 411 is otherwise separated from the lateral probing region 422 by a solder blocking gap 440 in which the laser submount 420 lacks the patterned metal layer 421. The solder blocking gap 440 is preferably adjacent to the laser diode 410, to help limit the spread or migration of molten solder during the assembly process.

In the embodiment of FIG. 4A, the patterned metal layer 421 includes a plurality of visual indicator tabs 416, 418 that extend from the laser diode mounting region 411 partially into the solder blocking gap 440, but that do not span completely across the solder blocking gap 440. In certain embodiments the visual indicator tabs 416, 418 may advantageously provide a visible indication of the spread and amount of molten solder during the assembly process, for example if the molten solder wets part or all of the surface of the visual indicator tabs 416, 418.

Figure 5B:
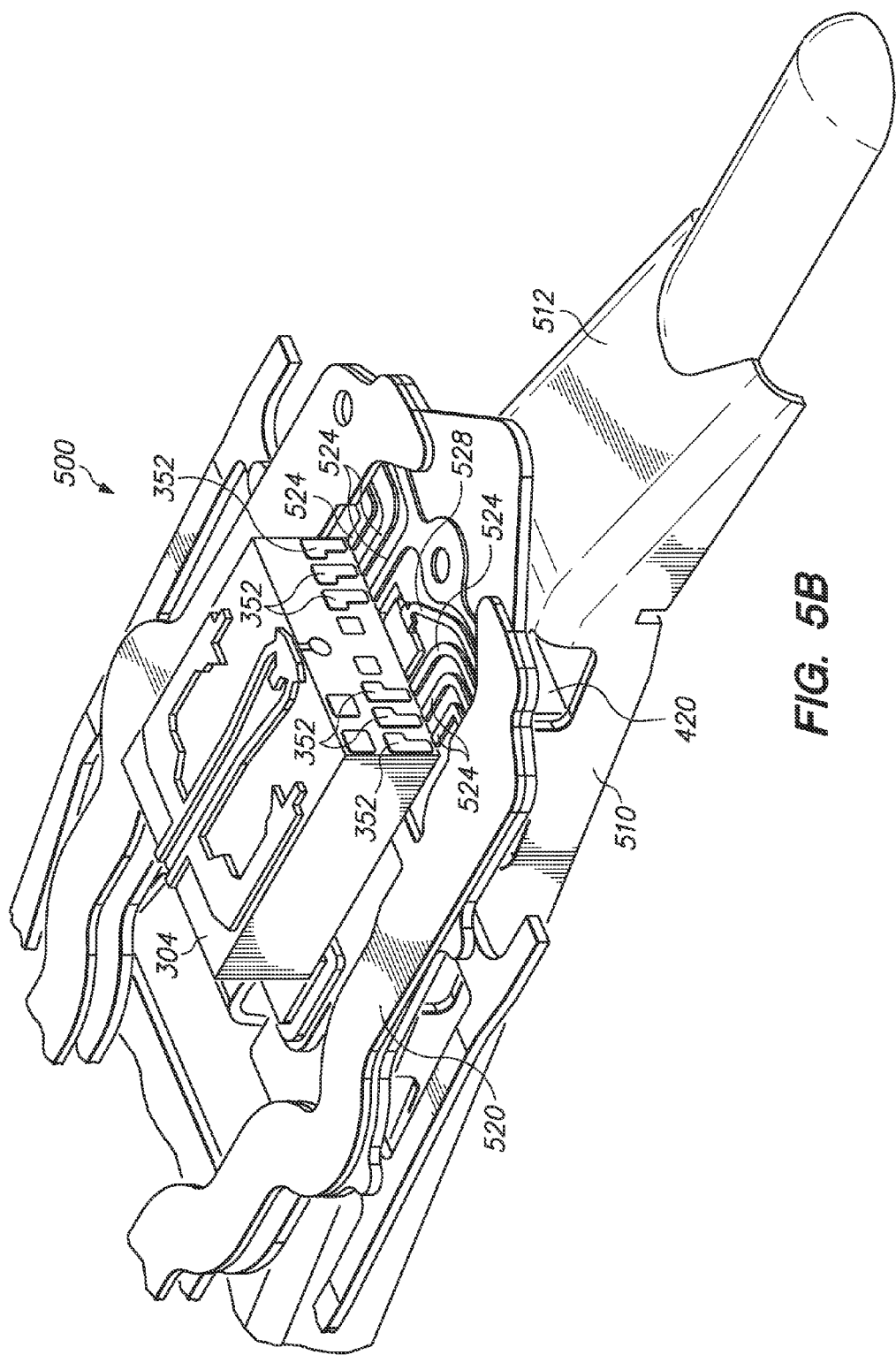
FIG. 5B is a perspective view of the distal portion of the head gimbal assembly (HGA) of FIG. 5A, except with the head being attached to a tongue of the suspension assembly.

FIG. 5A is a perspective view of the distal portion of a head gimbal assembly (HGA) 500 according to an embodiment of the present invention, with a head 304 (and mounted laser diode 410 and laser submount 420) being exploded away from a suspension assembly 510 of the HGA 500. FIG. 5B is a perspective view of the distal portion of the HGA 500 of FIG. 5A, except with the head 304 being attached to a tongue 522 of the suspension assembly 510. Numerical labels in FIGS. 5A and 5B that are the same as those described previously with reference to FIGS. 3, 4A, and 4B have the same meaning but to preserve conciseness may not be described again with reference to FIGS. 5A and 5B.

Now referring to the embodiment of FIGS. 5A and 5B, the suspension assembly 510 comprises a load beam 512 and a flexure 520. The flexure 520 includes a tongue 522 on which the read head 304 may be mounted. A first side of the tongue 522 may be in contact with the load beam 512, for example via a conventional dimple 514 that transfers a preload force (also known as a "gram load") from the load beam 512 to the head 304 to preload the head 304 against the surface of a rotating disk during disk drive operation.

Still referring to the embodiment of FIGS. 5A and 5B, the flexure 520 is a laminar flexure that includes a patterned electrically conductive layer that has six conductive traces 524, two conductive traces 526, and a conductive trace 528. The conductive traces may comprise copper, for example. The magnetic transducer 350 is electrically accessed through a subset of the head bond pads 352. Each of the head bond pads 352 is preferably electrically connected to a respective one of the conductive traces 524 by a conductive ball (not shown), for example by gold ball bonding or other applicable conventional methods. Hence, in the embodiment of FIG. 5A, the magnetic transducer 350 is electrically connected to a subset of the conductive traces 524, but is not connected to the conductive traces 526 or 528.

As shown in FIGS. 5A and 5B, the laser diode 410 passes through the opening 516 in the suspension assembly 510, and the laser diode 410 is electrically connected to (by making electrical contact with) at least the conductive trace 528, but is not connected to the conductive traces 524. The laser diode 410 may be electrically connected to the conductive traces 526, via a conductive path on or through the laser submount 420 that contacts the conductive traces 526. The conductive traces 524, 526, and 528 extend along the flexure 520, via an elongated flexure tail to electrical connections with an actuator flexible printed circuit (e.g. FPC 262, as shown in FIG. 2).

Figure 6:
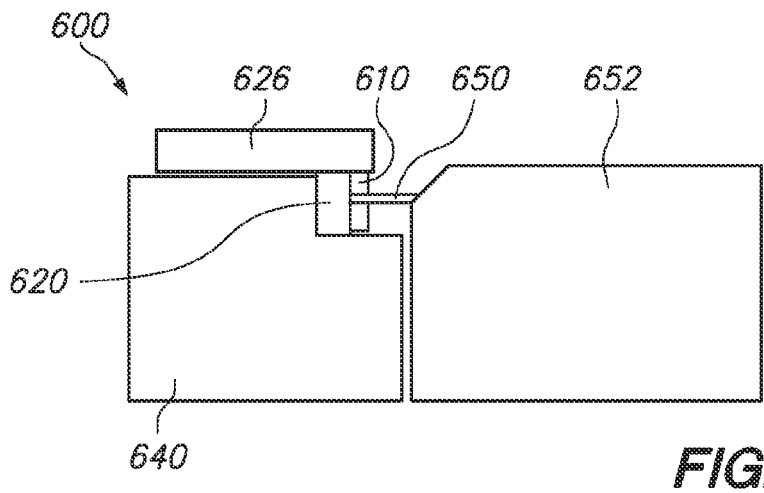
FIG. 6 depicts an apparatus for probing the laser submount during assembly with a slider.

FIG. 6 depicts an apparatus 600 for probing a laser submount 620 during alignment and assembly with a slider 626. Specifically, the laser submount 620 includes an attached laser diode 610, and is being aligned (e.g. using a precise positioning stage 640) and attached (e.g. by a soldering process) with the slider 626. During the alignment of the laser submount 620 with the slider 626, a conductive probe 650 extending from a probe unit 652 makes contact with a probing area of the laser submount 620, for example to electrically energize the laser diode 610. Light consequently emitted by the laser diode 610 may then be used to guide or confirm the alignment of the laser submount 620 to the slider 626 prior to and during the attachment process.

Figure 7:
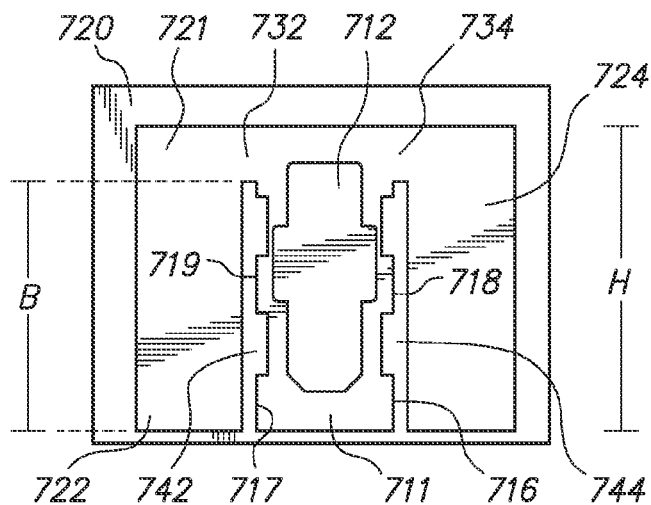
FIG. 7 depicts a laser submount according to an embodiment of the present invention.

FIG. 7 depicts a laser submount 720 according to an embodiment of the present invention. The laser submount 720 of FIG. 7 includes an electrically conductive surface layer 721. The electrically conductive surface layer 721 of the laser submount 720 may be a patterned metal layer (e.g. gold, copper, etc.) that includes a laser diode mounting region 711 and two lateral probing regions 722, 724. The laser diode mounting region 711 may include a deposited solder material 712 for attachment of a laser diode.

In the embodiment of FIG. 7, the laser diode mounting region 711 is electrically connected to the lateral probing region 722 by a bridge portion 732 of the patterned metal layer 721. However, the laser diode mounting region 711 is otherwise separated from the lateral probing region 722 by a solder blocking gap 742 in which the laser submount 720 lacks the patterned metal layer 721. The solder blocking gap 742 is depicted in FIG. 7 to be preferably adjacent to the left side of the laser diode mounting region 711, to help limit the spread or migration of molten solder during the assembly process.

Likewise, the laser diode mounting region 711 of FIG. 7 is electrically connected to the lateral probing region 724 by a bridge portion 734 of the patterned metal layer 721. However, the laser diode mounting region 711 is otherwise separated from the lateral probing region 724 by a solder blocking gap 744 in which the laser submount 720 lacks the patterned metal layer 721. The solder blocking gap 744 is depicted in FIG. 7 to be preferably adjacent to the right side of the laser diode mounting region 711, to help limit the spread or migration of molten solder during the assembly process.

In the embodiment of FIG. 7, the patterned metal layer 721 includes a plurality of visual indicator tabs 716, 717, 718, 719 that extend from the laser diode mounting region 711 partially into the solder blocking gaps 742, 744 but that do not span completely across the solder blocking gaps 742, 744. In certain embodiments the visual indicator tabs 716, 717, 718, 719 may advantageously provide a visible indication of the spread and amount of molten solder during the assembly process, for example if the molten solder wets part or all of the surface of the visual indicator tabs 716, 717, 718, 719.

In the embodiment of FIG. 7, the laser diode mounting region 711 defines a laser diode mounting region total height H (in a direction that would be normal to the mounting face of the slider—e.g. normal to the mounting face 314 of slider 326 of FIG. 4A). In certain embodiments, the laser diode mounting region total height H preferably may be in the range of 200 microns to 700 microns. In certain embodiments, the probing region 722 optionally may have a height that is equal to the laser diode mounting region total height H, as shown in FIG. 7.

In the embodiment of FIG. 7, the solder blocking gap 742 defines a solder blocking gap height B (measured parallel to the laser diode mounting region total height H) that preferably may be in the range of $2/3$rds to $5/6$ths of the laser diode mounting region total height H. In certain embodiments, such a range may provide a solder blocking gap height B that is large enough to effectively reduce molten solder migration during assembly, while also allowing a sufficient bridge portion 732 for electrical conduction from the lateral probing region 722. Specifically, in certain embodiments, the bridge portion 732 may define a bridge portion height H-B that is in the range of $1/6$ to $1/3$ of the laser diode mounting region total height H.

Figure 8:
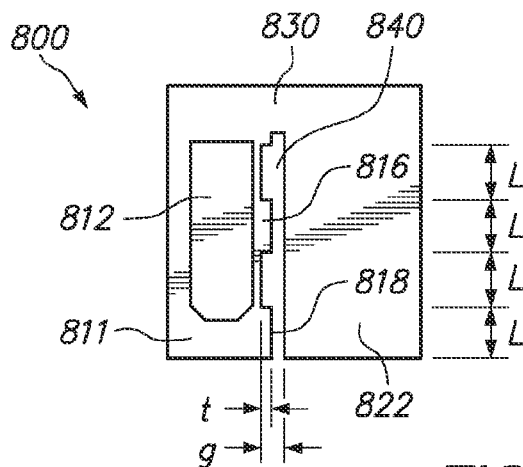
FIG. 8 depicts an electrically conductive surface layer of a laser submount according to another embodiment of the present invention.

FIG. 8 depicts the electrically conductive surface layer 800 of a laser submount according to another embodiment of the present invention. In the embodiment of FIG. 8, the electrically conductive surface layer 800 includes a laser diode mounting region 811 and a lateral probing region 822. The laser diode mounting region 811 includes a deposited solder material 812 for attaching a laser diode.

In the embodiment of FIG. 8, the laser diode mounting region 811 is electrically connected to the lateral probing region 822 by a bridge portion 830 of the patterned electrically conductive surface layer 800. However, the laser diode mounting region 811 is otherwise separated from the lateral probing region 822 by a solder blocking gap 840 in the patterned electrically conductive surface layer 800. The solder blocking gap 840 is preferably adjacent to the laser diode mounting region 811, to help limit the spread or migration of molten solder during the assembly process.

In the embodiment of FIG. 8, the patterned electrically conductive surface layer 800 includes a plurality of visual indicator tabs 816, 818 that extend from the laser diode mounting region 811 partially into the solder blocking gap 840, but that do not span completely across the solder blocking gap 840. In certain embodiments, the visual indicator tabs 816, 818 may optionally be regularly or periodically spaced, for example on a repeating length period L that may optionally be approximately $\frac{1}{5}^{th}$ of a total height of the laser diode mounting region 811. In certain embodiments the visual indicator tabs 816, 818 may advantageously provide a visible indication of the spread and amount of molten solder during the assembly process, for example if the molten solder wets part or all of the surface of the visual indicator tabs 816, 818.

In the embodiment of FIG. 8, the solder blocking gap 840 defines a gap width g (in a direction that would be parallel to the mounting face of the slider—e.g. parallel to the mounting face 314 of slider 326 of FIG. 4A) that, in certain embodiments, preferably may be in the range of 30 microns to 50 microns. In certain embodiments, each of the plurality of visual indicator tabs 816, 818 may extend into the solder blocking gap 840 by an extension distance t that preferably may be in the range of 10 microns to 15 microns. In certain embodiments, the foregoing ranges for the gap width g and the indicator extension distance t may advantageously reduce the risk of solder migration across the solder blocking gap 840.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A head comprising:
   a slider having an air bearing surface, a trailing face that is normal to the air bearing surface, and a mounting face that is opposite but substantially parallel to the air bearing surface;
   a magnetic transducer disposed on the trailing face of the slider; and
   a laser device affixed to the mounting face, the laser device including
      a submount having an electrically conductive surface layer that is normal to the mounting face, the electrically conductive surface layer being a patterned metal layer that includes a laser diode mounting region and a lateral probing region; and
      a laser diode that is soldered to the laser diode mounting region;
   wherein the laser diode mounting region is connected to the lateral probing region by a bridge portion of the patterned metal layer, and the laser diode mounting region is otherwise separated from the lateral probing region by a solder blocking gap in which the submount lacks the patterned metal layer and that is adjacent to the laser diode; and
   wherein the laser diode mounting region defines a laser diode mounting region total height normal to the mounting face, and the solder blocking gap defines a solder blocking gap height normal to the mounting face that is in the range of ⅔rds to ⅝ths of the laser diode mounting region total height.

2. The head of claim 1, wherein the laser diode mounting region total height is in the range of 200 microns to 700 microns.

3. The head of claim 1, wherein the probing region defines a probing region total height normal to the mounting face that is equal to the laser diode mounting region total height.

4. The head of claim 1, wherein the bridge portion defines a bridge portion height normal to the mounting face that is in the range of ⅙ to ⅓ of the laser diode mounting region total height.

5. The head of claim 1, wherein the solder blocking gap defines a gap width parallel to the mounting face in the range of 30 microns to 50 microns.

6. The head of claim 1, wherein the patterned metal layer further comprises a plurality of visual indicator tabs that extend from the laser diode mounting region partially into the solder blocking gap, but that do not span completely across the solder blocking gap.

7. The head of claim 6, wherein each of the plurality of visual indicator tabs extends 10 microns to 15 microns into the solder blocking gap.

8. The head of claim 1, wherein the patterned metal layer comprises gold or copper.

9. The head of claim 1, wherein the patterned metal layer has a thickness in the range 100 nm to 600 nm.

10. The head of claim 1, wherein the laser diode is soldered to the laser diode mounting region by a solder material that includes tin and has a solder material thickness in the range 1 micron to 3 microns.

11. A disk drive comprising:
    a disk drive base;
    a disk rotably attached to the disk drive base;
    an actuator pivotably attached to the disk drive base, the actuator including an arm;
    a head mounted on the arm, the head including
       a slider having an air bearing surface facing the disk, a trailing face that is normal to the air bearing surface, and a mounting face that is opposite but substantially parallel to the air bearing surface;
       a magnetic transducer disposed on the trailing face of the slider; and
       a laser device affixed to the mounting face, the laser device including
          a submount having an electrically conductive surface layer that is normal to the mounting face, the electrically conductive surface layer being a patterned metal layer that includes a laser diode mounting region and a lateral probing region; and
          a laser diode that is soldered to the laser diode mounting region;
       wherein the laser diode mounting region is connected to the lateral probing region by a bridge portion of the patterned metal layer, and the laser diode mounting region is otherwise separated from the lateral probing region by a solder blocking gap in which the submount lacks the patterned metal layer and that is adjacent to the laser diode; and
       wherein the laser diode mounting region defines a laser diode mounting region total height normal to the mounting face, and the solder blocking gap defines a solder blocking gap height normal to the mounting face that is in the range of ⅔rds to ⅝ths of the laser diode mounting region total height.

12. The disk drive of claim 11, wherein the laser diode mounting region total height is in the range of 200 microns to 700 microns.

13. The disk drive of claim 11, wherein the probing region defines a probing region total height normal to the mounting face that is equal to the laser diode mounting region total height.

14. The disk drive of claim 11, wherein the bridge portion defines a bridge portion height normal to the mounting face that is in the range of 1/6 to 1/3 of the laser diode mounting region total height.

15. The disk drive of claim 11, wherein the solder blocking gap defines a gap width parallel to the mounting face in the range of 30 microns to 50 microns.

16. The disk drive of claim 11, wherein the patterned metal layer further comprises a plurality of visual indicator tabs that extend from the laser diode mounting region partially into the solder blocking gap, but that do not span completely across the solder blocking gap.

17. The disk drive of claim 16, wherein each of the plurality of visual indicator tabs extends 10 microns to 15 microns into the solder blocking gap.

18. The disk drive of claim 11, wherein the patterned metal layer comprises gold or copper.

19. The disk drive of claim 11, wherein the patterned metal layer has a thickness in the range 100 nm to 600 nm.

20. The disk drive of claim 11, wherein the laser diode is soldered to the laser diode mounting region by a solder material that includes tin and has a solder material thickness in the range 1 micron to 3 microns.

* * * * *